US009225532B2

(12) United States Patent
Counterman

(10) Patent No.: US 9,225,532 B2
(45) Date of Patent: Dec. 29, 2015

(54) METHOD AND SYSTEM FOR PROVIDING REGISTRATION OF AN APPLICATION INSTANCE

(75) Inventor: Raymond Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 899 days.

(21) Appl. No.: 12/960,997

(22) Filed: Dec. 6, 2010

(65) Prior Publication Data
US 2012/0144457 A1 Jun. 7, 2012

(51) Int. Cl.
 G06F 21/00 (2013.01)
 H04L 9/32 (2006.01)
(52) U.S. Cl.
 CPC ............ *H04L 9/3271* (2013.01); *H04L 9/3247* (2013.01)
(58) Field of Classification Search
 CPC ..................... H04L 9/3271; H04L 9/3247
 See application file for complete search history.

(56) References Cited

U.S. PATENT DOCUMENTS

| | | | |
|---|---|---|---|
| 8,051,491 B1 * | 11/2011 | Cavage et al. | 726/30 |
| 8,433,914 B1 * | 4/2013 | Philpott et al. | 713/180 |
| 2006/0101507 A1 * | 5/2006 | Camenisch | 726/5 |
| 2006/0116966 A1 * | 6/2006 | Pedersen et al. | 705/59 |
| 2007/0155306 A1 * | 7/2007 | Koli et al. | 455/3.01 |
| 2008/0172341 A1 * | 7/2008 | Crandell | 705/75 |
| 2009/0151006 A1 * | 6/2009 | Saeki et al. | 726/28 |

* cited by examiner

Primary Examiner — David García Cervetti
Assistant Examiner — Kendall Dolly

(57) ABSTRACT

An approach for registration an application instance is provided. A registration request including credential information related to a user, a device and an instance of an application resident on the device is generated. The registration request is transmitted over a network to a registration platform. A unique identifier that is encrypted, in response to registration of the application instance is received from the registration platform. This unique identifier is used to securely authenticate communication with the application instance.

10 Claims, 17 Drawing Sheets

METHOD AND SYSTEM FOR PROVIDING REGISTRATION OF AN APPLICATION INSTANCE

RELATED APPLICATIONS

This application is related to U.S. patent application entitled, "Secure Registration and Authentication for Client Application Access to Protected Resources," Ser. No. 12/960,956 filed December 2010; which is incorporated herein by reference in its entirety.

BACKGROUND INFORMATION

An application instance is a copy of a software program for operation on a single device operating system. An application may be stolen, misused, used to cause harm or used for other non-intended purposes. The provider of an application and the system which supports its use must trust that any instance of an application has been authenticated and that the end-user can be authorized to use it. If the application is compromised, rogue applications could be developed or the application could be pirated. In communications networks, particularly mobile networks with usually limited resources, this problem is exacerbated as rogue applications could waste network resources without being noticed.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF THE DRAWINGS

A preferred method and system for providing application registration is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
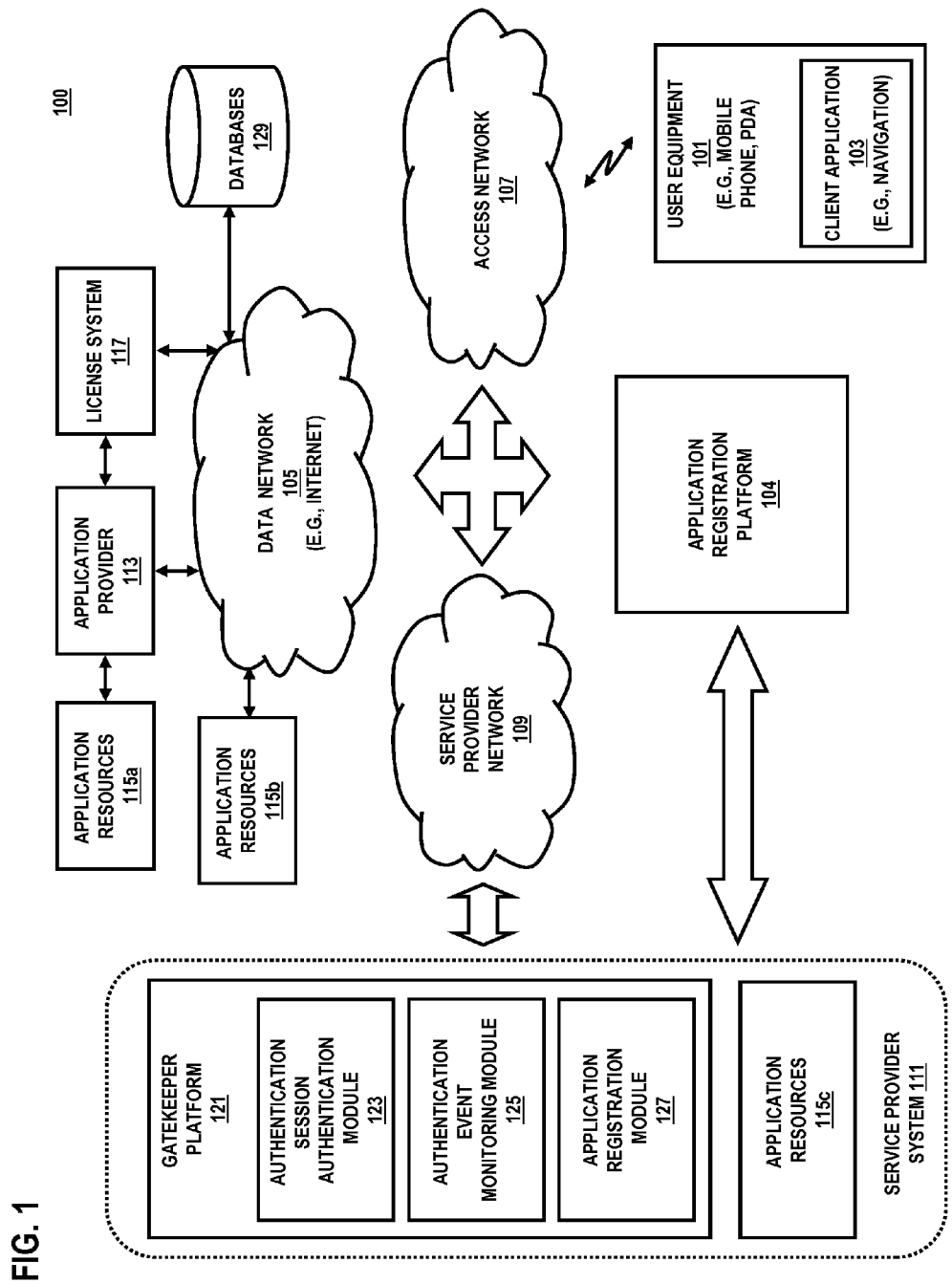
FIG. 1 is a diagram of a system capable of registering an application instance, according to one embodiment.

FIG. 1 is a diagram of a system capable of registering an application instance, according to one embodiment. In various embodiments, system 100 may include one or more user devices (or user equipment) 101 (of which only one is shown) configured to execute an application (or process) 103. An application may have a set of credentials that must be authenticated for the application to operate properly or to be granted permission to access network resources. Also, the application may be modified to operate in manner that is unintended or unauthorized, such that this "rogue application" consumes or access resources of the device and/or network.

User equipment 101 may be any computing device capable of communicating over an access network 107; moreover, in certain embodiments, user devices may be configured to perform voice communications. Hence, such user device 101 may be any suitable computing device, such as a Voice over Internet Protocol (VoIP) phone, skinny client control protocol (SCCP) phone, session initiation protocol (SIP) phone, IP phone, personal computer, softphone, workstation, terminal, server, etc. Furthermore, these devices may be mobile devices, such as a cellular phone, radiophone, satellite phone, smart phone, wireless phone, personal digital assistant (PDA), pocket personal computer, tablet, set-top box, customized hardware, etc.

Under the scenario of FIG. 1, the application 103 can include sophisticated applications, such as a navigation application that utilizes network resources as well as resources of the user equipment 101—e.g., a global positioning system (GPS) receiver. Hence, if the navigation application is rogue, unauthorized used or waste of resources can occur; moreover, such usage may be undetected. Accordingly, system 100 includes an application registration platform 104 that provides registration of an instance of an application. In one embodiment, platform 104 can be deployed as one or more servers. Upon registration, the application instance will be uniquely identified as well as authenticated, thereby ensuring a high level of security. In this manner, a network service provider or any other service provider associated with networks 105, 107 and 109 could reduce security risk, e.g., by blocking access for a particular application instance, prove the validity of transactions for account disputes (non-repudiation), and notify an application provider of possible security risks surrounding a particular application.

According to various embodiments, the user equipment 101 is configured to use communications and computer networks to communicate and exchange information and receive services from various entities via several networks 105, 107, and 109. Thus, the user equipment 101 is enabled to exchange information through the (public or private) data network 105 via an access network 107.

In certain embodiments, access network 107 may include one or more networks, such as data network, telephony network, and/or wireless network, and can interact with other data networks, e.g., a service provider network 109 (maintained by a network service provider system 111) and a public data network 105 (e.g., Internet). These networks 105-109 may be any suitable wireline and/or wireless network, and be managed by one or more service providers. For example, telephony network within access network 107 may include a circuit-switched network, such as the public switched telephone network (PSTN), an integrated services digital network (ISDN), a private branch exchange (PBX), or other like network. The wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Moreover, the data network 105, as part of the access network 107, may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 105-109 may be completely or partially contained within one another, or may embody one or more of the aforementioned infrastructures.

According to some embodiments, application 103 is provided as a software/hardware package to a user by an application provider 113. In various embodiments the seller/granter of the application 103 might be different from an entity which provides related services and facilities. For example, application 103 might access to application resources 115a, maintained by the application provider 113. Furthermore, the application 103 can access resources 115b on the public data network 105, or resources 115c, which could be accessed via the access network 107 or possibly through resources the network service provider network 109. In these cases, the resources 115a-115c might be protected for various reasons; and the resource providers would require the application to be authenticated to prior to access.

As an example, upon purchasing and/or downloading a navigation application 103 for user equipment 101 (e.g., a mobile phone), the application provider 113, might host different facilities 115a, such servers, databases, computational resources, etc, to facilitate the execution of application 103. Moreover, for example, the mobile phone 101, as a GPS enabled phone, might be configured to launch a navigation application hosted by an application provider 113. The application provider servers systems 115a, and application 103 not only help the user to navigate roads, but also provide the user road and traffic information. Such an application typically accesses the network resources available through public networks (e.g., such as resources 115b) as well as servers and resources maintained by the application provider or other resources maintained by other parties, e.g., resource 115c. As an example of the resource 115c, in some embodiments, application 103 can be a calendar application, which requires access to calendar data from another user. The application 103 should request access to such data and obtain consent by the user, or a network access provider or a network service provider might grant the application 103 permission to access this calendar data. However, the permission granter or said another user can restrict the access by application 103 (i.e., a third party application) to their calendar only for a period of time (a default may be an hour, for example). There are various security oriented and network management/administration benefits for network service providers and for application providers (and their users) to require such third party registration process.

Application resource(s) 115a-115c, which may be deemed protected resources, may include one or more devices that store data that are protected from unauthorized access by client applications. Limited access by application 103 may be controlled using authentication techniques (e.g., authentication and key agreement (AKA) techniques) described herein. That is, by way of example, a client identifier and a device identifier previously assigned to the client application, and the device on which the client application is installed, may be used in an Authentication and Key Agreement (AKA) process by registration platform 104. Subsequently, the registration platform 104 may supply a valid encrypted application identifier that could be used in another session authentication process to grant the application access to resources.

In some embodiments, the application 103 may be executed by any type of smart card usable for inserting into device 101 and for storing data relevant to the operation of device 101. For example, the application 103 may be executed by a Universal Integrated Circuit Card (UICC), a removable user identity card (R-UIM), a subscriber identity module (SIM), a universal subscriber identity module (USIM), or an Internet Protocol (IP) multimedia services identity module (ISIM). Such an application (also denoted as a device application) also might access any of the protected resources 115a-115c, and the registration and authentication methods described herein facilitate secured access by device application to needed protected resources. It is contemplated that the device 101 is capable of storing the information needed in the authentication process and transmitting that information to the various authentication entities.

In some embodiments, a license may be supplied by the application provider 113 to use the application and access resources. In such a scenario, a license system 117 can be utilized to provide facilities for license verification. According to one embodiment, the license system 117 can include an application distribution system maintained by an application distributor entity, a license verification library maintained by an application provider or a device provider, or any other facility which could verify legality and authenticated access of a user's use of an application. Another example of such a facility includes a controlling entity e.g., a control verification system and database to limit the access.

Alternatively, the license system 117 can be an application provider's user account sign-on, in which the system 117 is accessed to download (upon purchasing) an application. Such a sign-on system could later be queried by the registration platform 104 to verify authorized use of the application by the user. It also contemplated that the registration process may occur as a component of the application provider's transaction with the user to deliver their application, e.g., during/post an account set-up, or first runtime.

According to various embodiments, at the end of a registration process, the application has a unique identifier and a secret used to authenticate this instantiation of the application (Registration Key) and its subscriber.

A registration and session authentication system, could include different components. According to various embodiments, a registration platform 104 securely registers the application. In one embodiment, the registration platform 104 can be part of the network service provider system 111 or a separate entity. As shown, the gatekeeper platform 121 as part of the network service provider system 111, can perform operations associated with granting the application an authenticated session to access the protected resources. By way of example, the gatekeeper platform 121 includes an application session authentication module 123, an authentication event monitoring module 125, and an application registration module 127. The application session authentication module 125 authenticates a registered application and upon authentication grants the application 103 a session to access the resources 115a-115c. The module 123 can set an expiration time on the session after which the application is required to get authenticated again. In some embodiments, if application authentication fails then the module 123 calls the authentication event monitoring module 125 to monitor the failed authentication and registration attempts in order to detect possible malicious applications or parties or to block the user or application.

By way of examples, various embodiments described herein may enable the secure multifactor registration and authentication of a client application instance prior to permitting the client application access to protected data or resources (e.g., resources 115a-115c).

Application registration module 127 could replace platform 104 in some embodiments.

In order to perform authentication and registration operation, different authorization entities need to retrieve information about devices, users, or applications from trusted sources. According to various embodiments, such information could be stored one or more several databases—collectively shown as databases 129. Databases 129 can include/store some or all trusted credentials used in the registration and authentication processes. Such databases 129 can be maintained by trusted parties. Different registration and authentication entities can also obtain trusted credentials from the databases 129 and compare the obtained credentials with all or some of the credentials provided by the application or user during the secured registration or authentication processes.

In some embodiments the databases 129 might comprise, include or be a part of an Authentication, Authorization, and Accounting (AAA) system/server. An example of such system is when the access network 107 is a CDMA wireless data network further operating according to standards of the Internet Protocol (IP). Furthermore, in some embodiments, the databases 129 might comprise, include, or be a part of a Home Location Register (HLR) system in conjunction with a global system for mobile communications (GSM) access data network. The database 129 might be maintained by a trusted party possibly including the network service provider system 111 or possibly the access network provider.

In other embodiments database 129 may include a device and/or memory unit for storing a data structure (e.g., a database) that further stores client and device credentials used during the authentication techniques described herein. Authorization servers such as registration platform 104 (or module 127) or the session authentication module 123 may retrieve client and device credentials from database 129. Database 129 may include a device and/or memory unit that is separate or part of the any of the authorization servers. For example, in some embodiments databases 129 might be part of the registration platform 104 or any other entity in environment 100. Databases 129 may further include distributed devices and/or memory units such that database 129 is in the form of a distributed database.

It is contemplated that different entities depicted in FIG. 1 could be combined in one or another or could be provided with facilities to communicate and exchange information according to various embodiments. In some embodiments, the registration and authentication service (e.g., platform 104 and license system 117 and even databases 129) may be provided as a managed service as part of a service provider network 109, and the network service provider might provide secured registration and session authentication services in coordination/conjunction with one or more of the application service providers 113. In certain embodiments, many of the services are contemplated to be Web-based online services and various entities although physically deployed in different locations could seamlessly communicate and exchange information in order to realize different features disclosed herein. For example it is contemplated that the application provider 113 can seamlessly communicate with the network service provider system 111, or with registration platform 104 or license system 117.

Figure 2B:
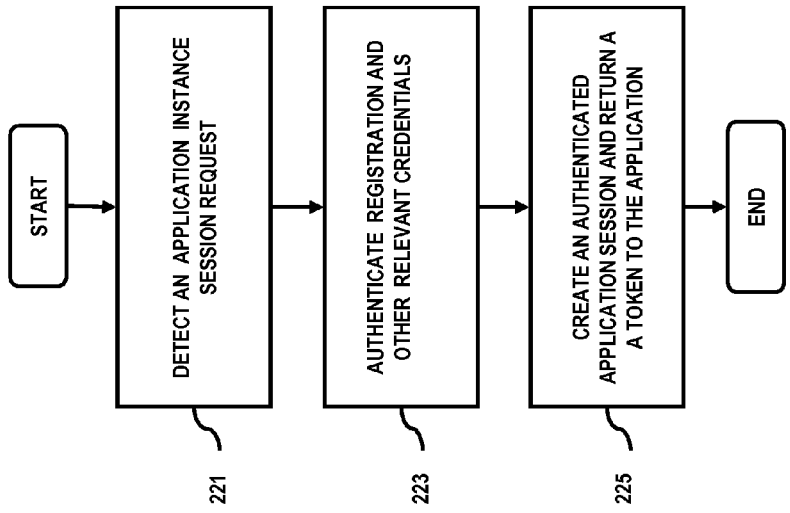
FIGS. 2A and 2B are flowcharts of the processes for registering an application and subsequent session authentication, according to various embodiments.
Figure 2A:
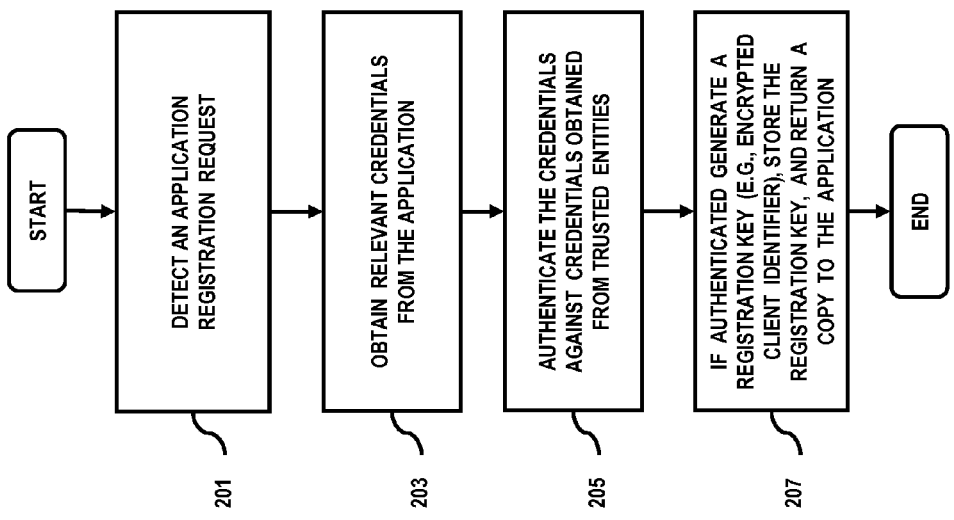

FIGS. 2A and 2B are flowcharts of the processes for registering an application and subsequent session authentication, according to various embodiments. As seen in FIG. 2A, in step 201 the registration platform 104 receives a registration request from application 103 residing on user device 101. Through establishing, according to one embodiment, a secured communication channel (e.g., SSL, HTTPS), the register platform 104, as in step 203, obtains relevant credentials (or credential information) from the application 103. Such credential information can include any credentials that identifies or authenticates the user, the application 103, or the device 101. In some embodiments, the application identifier is a name or string uniquely defining the application. In some embodiments, the application identifier may include a unique identifier assigned to the client application by, for example, an authentication protocol (e.g., OAuth 1.0).

In certain embodiments, a user identifier can be the name or string for an authenticated user, such as a Mobile Directory Number (MDN), International Mobile Subscriber Identity (IMSI), username, email address.

The device identifier may include a unique identifier assigned to the device by, for example, a network service provider. For example, the device identifier may include an International Mobile Subscriber Identity (IMSI), Integrated Circuit Card (ICC)-ID, an International Mobile Equipment Identity (IMEI), Mobile Identification Number (MIN), a Mobile Equipment Identifier (MEID), an Electronic Serial Number (ESN), a Mobile Station International Subscriber Directory Number (MSISDN), a Medium Access Control (MAC) address, or an Internet Protocol Multimedia Subsystem Private Identifier (IMPI). Also, the registration platform 104 can utilize other parameters to increase the security level.

In step 205, the registration platform 104 authenticates the credentials against credentials obtained from trusted entities, for example trusted credentials obtained from the databases 129. Upon verification of the application credentials against trusted credentials, the registration platform 104, per step 207, generates an encrypted client identifier (e.g., registration key), which is then stored; and a copy is returned to the application 103. The encrypted client identifier can be used in the session authentication step by the application session authentication module 123.

Upon completion of the registration process, the application 103 can be instructed by the user to establish an application session, or the user might launch an instance of the application 103. The application 103 then interacts with the application session authentication module 123 to establish an authenticated application session.

As seen in FIG. 2B, an application session authentication process involves the application session authentication module 123, per step 221, detecting an application instance session request from application 103. In step 223, the session authentication module 123 obtains registration and other credentials from the application 103. In one embodiment, the registration credentials can include the encrypted client identifier that was generated by the registration platform 104. The session authentication module 123, as in step 225, authenticates the obtained said registration credentials against trusted ones. In step 225, the application session authentication module 123 creates an authenticated session for the application 103 to access the related protected resources. This may include returning a session token to the application 103 as well informing the application 103 of a session expiration time for increased security.

Figure 3A:
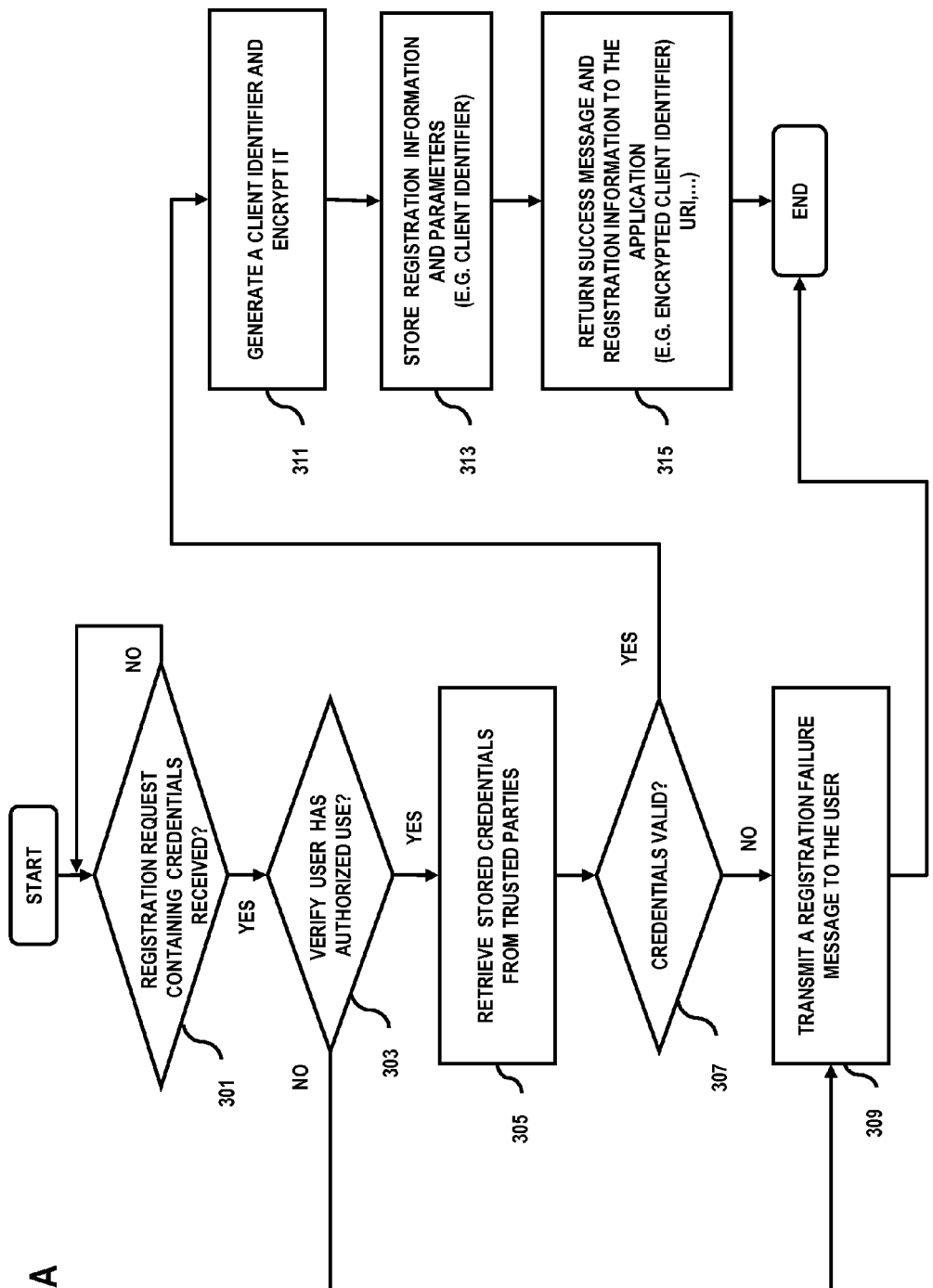
FIGS. 3A and 3B are flowcharts of an application registration process, according to one embodiment.
Figure 3B:
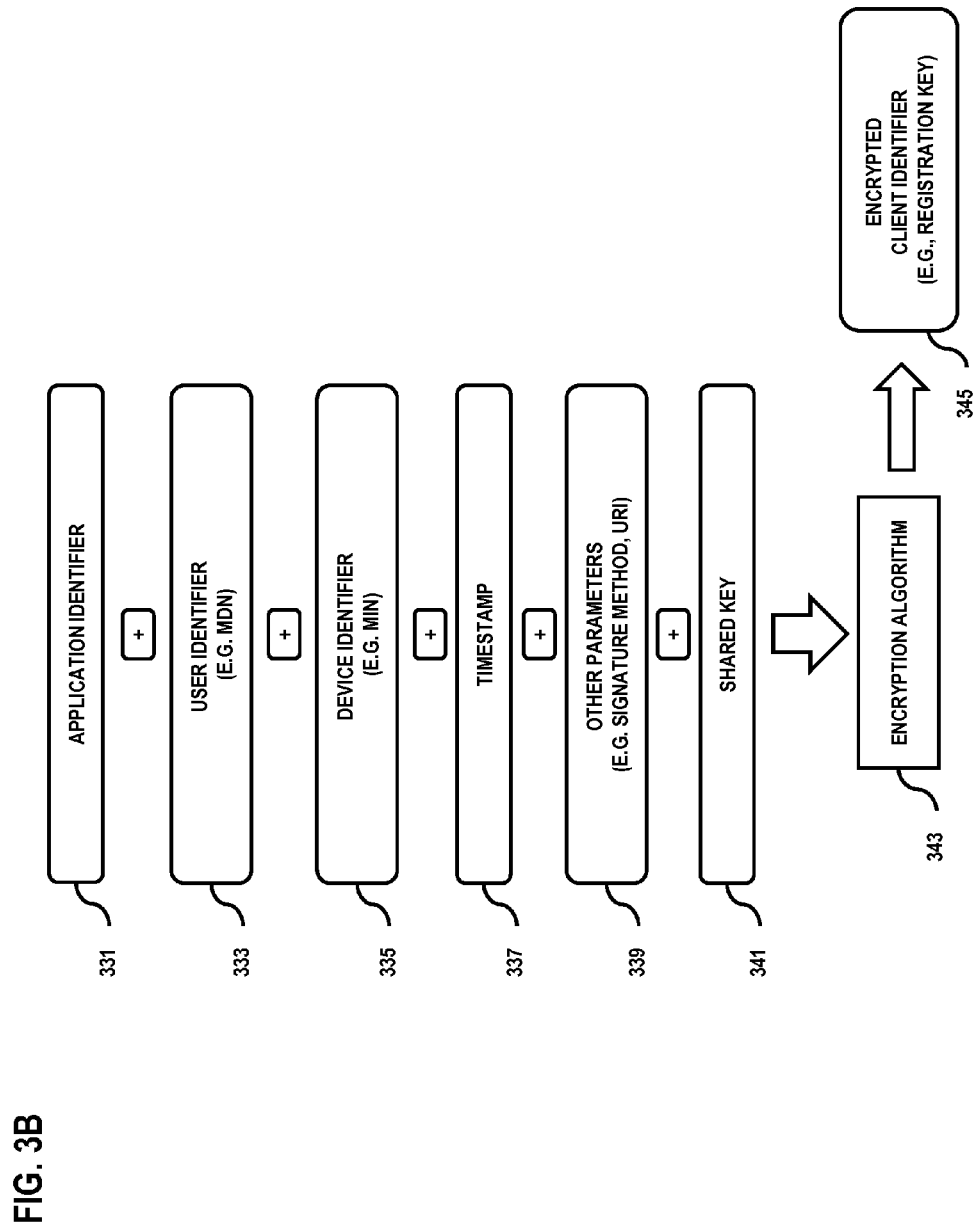

FIGS. 3A and 3B are flowcharts of an application registration process, according to one embodiment. As shown in FIG. 3A, in step 301, the registration platform 104 receives a registration request from an application 103 residing on user equipment 101. Such a request contains several credentials that may be used in the registration process. According to certain embodiments, the credentials can include an application identifier (e.g., a serial license number), a user identifier (e.g., MDN), and an equipment identifier (e.g., MEID or ICC-ID).

In an optional step 303, the registration platform 104 by verifying the application identifier with the license system 117, authenticates the user's permission to use this instance of the application. If the application instance is not authorized in step 309, the registration platform 104 transmits a registration failure message to the application. If the application instance is an authorized instance, then in step 305 the registration platform 104 retrieves the stored credentials from trusted parties. For example, the registration platform 104 retrieves trusted MDN and MEID from the databases 129. In some embodiments, the registration platform 104 transmits the MDN obtained from application to databases 129, and in response, the platform 104 receives a matched trusted MDN and MEID pair.

In step 307, the registration platform 104 compares the credentials obtained from the application 103 with those obtained from the trusted parties. If the credentials are not validated, then the platform 104 transmits a registration failure message to the user (as in step 309); otherwise the registration platform 104 generates an encrypted client identifier according to any known encryption algorithm. In some embodiments, the registration platform 104 uses an encryption key shared with the session authentication module 123 for the encryption process. In some embodiments, the client identifier generation and registration (as in step 311) is performed according the process depicted in FIG. 3B.

In step 313, the registration platform 104 stores registration information and parameters including the encrypted client identifier. In step 315, the registration platform 104 returns registration success message together with possibly registration information to the application. In some embodiments, such registration information could include the encrypted client identifier, and possibly a Uniform Resource Identifier (URI) of other functions and servers. For example, the registration platform 104 can provide an address to locate an application session authentication module 123. This can be useful in case the application 103 does not have such information. As another example, an URI could be a "call-back" URI for providing some other function such as sending error messages when the application 103 fails to authenticate with the application session authentication module 123.

In some embodiments, the encrypted client identifier can be a persistent anonymous identifier but it will have a limited life-time for security purposes. The encrypted client identifier expires to prevent use of a rogue application, which has been coded not to register. When the encrypted client identifier expires, the application must re-register.

FIG. 3B illustrates the process of the client identifier generation and encryption, according to some embodiments. The registration platform 104 feeds different parameters to an encryption algorithm wherein an encryption key shared with the application session authentication module 123 could be used. As a result, the application session authentication module 123 will be enabled to decrypt such an encrypted client identifier. In some embodiments, the parameters fed to the encryption algorithm might include the application identifier 331, which is a name or string unique for the application as a computer program. The parameters may include a user or subscriber identifier (e.g., MDN), which binds subscription to the application 103. The parameters fed to the encryption algorithm further could include a device identifier 335 (e.g., MIN, MEID); these parameters bind the user device 101 to the application 103. Further, another parameter 337 can include a time stamp (e.g., date and time of the encryption process) as well as other parameters 339, e.g., signature method used, or any relevant URI's. As mentioned, the shared key 341, in some embodiments, is used as an encryption key that is shared between the registration platform 104 and the application session authentication module 123 of the gatekeeper platform 121.

The encryption algorithm 343 evidently can be any standard or known encryption scheme with various levels of strength and sophistication. The output of the algorithm 343 provides the encrypted client identifier 345 (e.g. registration key) that the registration platform 121 transmits to the application 103.

It is contemplated that in some embodiments, depending on the strength credentials used in the registration process various level of trustworthiness associated with applications could be established. For example, a network service provider or another application provider might assign such levels to third party applications accessing their resources and limit the access according to trustworthiness. For example, levels such as "unregistered", "registered", and "trusted" could be assigned to various applications. Any application could then access resources according to its trustworthiness level, or users/resources could decide based on the application's trustworthiness level to grant what type of access. It is contemplated that such different levels of trustworthiness in the registration process could established based on the number or type or strength of credentials provided by the application or other relevant factors.

Figure 4A:
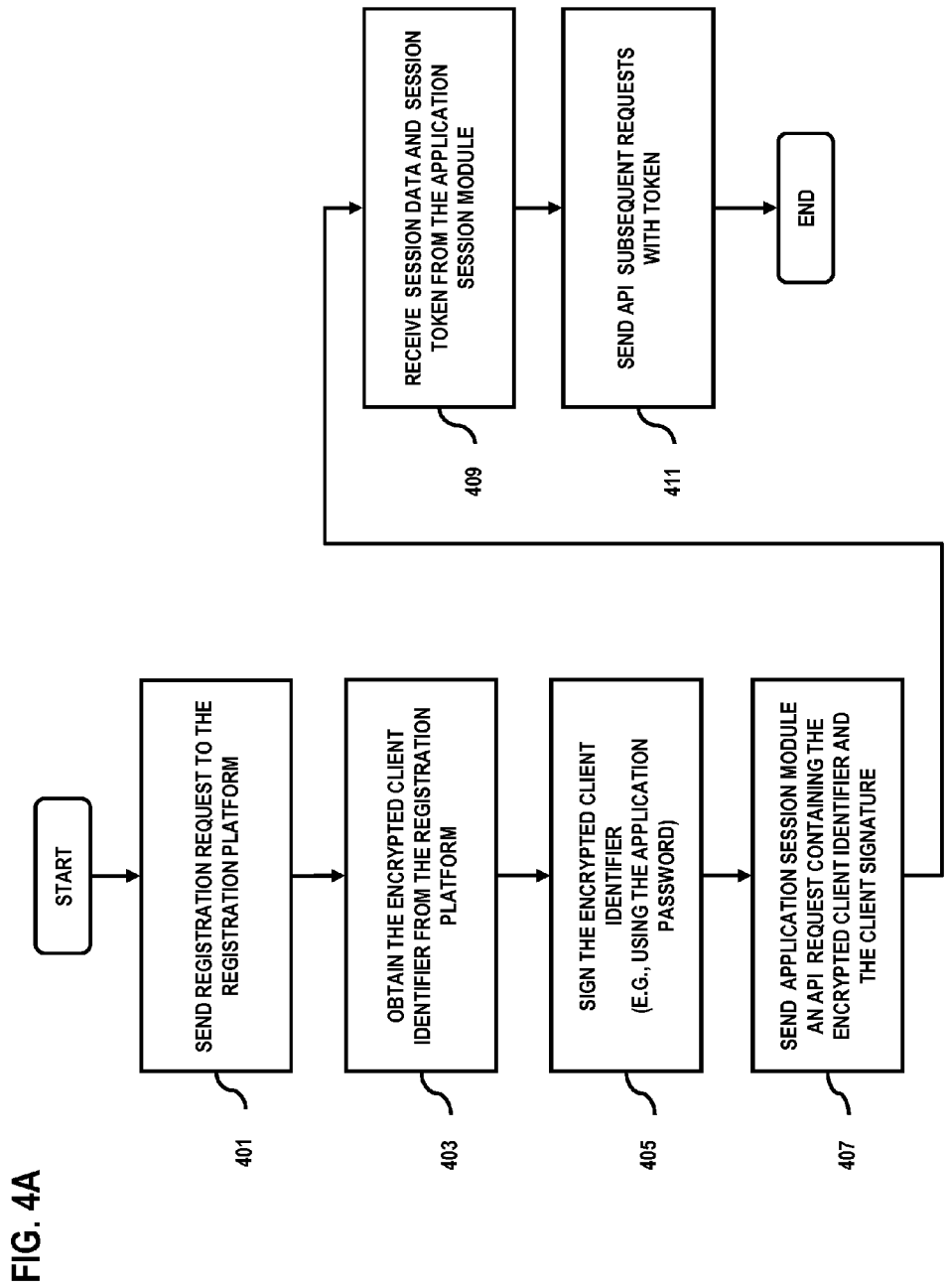
FIGS. 4A and 4B are, respectively, a flowchart of an exemplary registration process, and a diagram of a signature generation process performed as a part of the registration process, according to various embodiments.
Figure 4B:
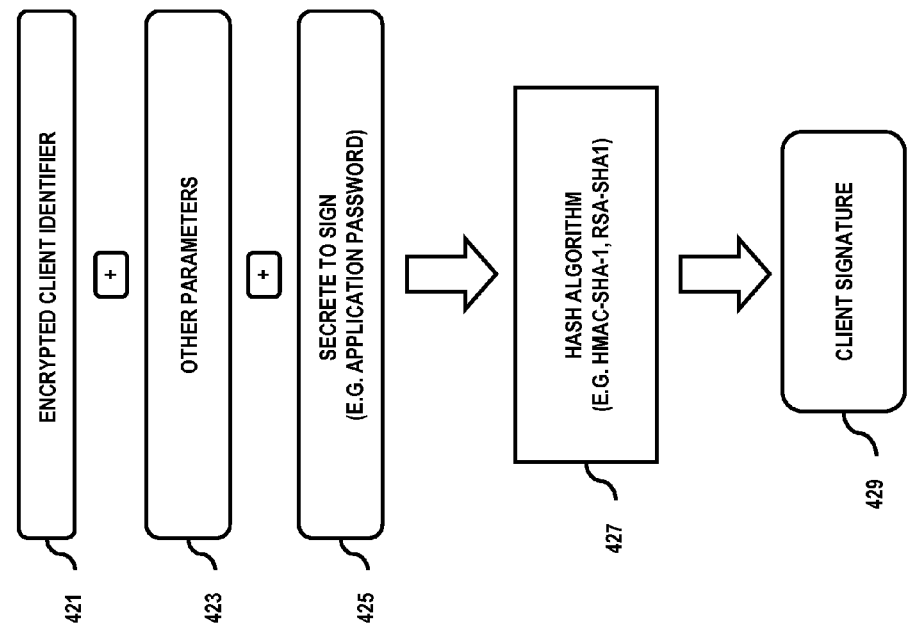

FIGS. 4A and 4B are, respectively, a flowchart of an exemplary registration process, and a diagram of a signature generation process performed as a part of the registration process, according to various embodiments. In one embodiment, the steps of FIGS. 4A and 4B could include those performed by application 103 residing on the user equipment 101. As shown in FIG. 4A, in step 401, the application 103 initiates sending of a registration request to the registration platform 104. Such a request can include various credentials, e.g., the identifiers as described before. The application 103 could embed credential information, such as the application identifier, a user identifier (e.g., MDN), and a device identifier (e.g., MEID), in the request. In some embodiments, the transmitted credential information can include a license file, which can be authenticated by the license system 117. In certain embodiments the application 103 can securely establish, using the HTTPS protocol, a registration session, wherein the application 103 can provide the described credential information in the HTTPS registration request.

In step 403, upon successful registration, the application 103 extracts the encrypted client identifier from the registration response from the registration platform 104. As discussed, in the response from the registration platform 104, the application 103 might receive the URI to access the application session authentication module 123, for example. In step 405, the application 103 (or the software/hardware combination residing in the user equipment) signs the encrypted client identifier using a secret and a hashing algorithm to create client application signature. Such a hashing process increases the security level of the subsequent authentications. In some embodiments, the client signature is created according to the steps depicted in FIG. 4B.

In step 407 the application sends an Application Programming Interface (API) request to the application session authentication module 123 containing the encrypted client identifier and the client signature, and waits for the application session authentication module 123 to grant a session. Upon successful authentication by the application session authentication module 123, in step 409, the application 103 receives session data and session token from the application session module 123. The session data can include the session expiration time, based on which the application might try to request new authenticated session. Prior to session expiration, if the user launches a new instance of the application, then as depicted in step 411, subsequent session requests or other exchanges with the application session module 123 could contain said session token.

FIG. 4B is a diagram depicting the process for creating the client application signature, according to one embodiment. The application 103 or the hardware/software combination residing on the user equipment 101 feeds a set of parameters to a hashing function in order to create a client signature. According to one embodiment, the encrypted client identifier 421, some other parameter 423 (e.g., time of day as a nonce), and a secret 425 (e.g., application password) are fed to a hash algorithm 427. In some embodiments, the secret is shared between the application 103 and the application session authentication module 123 or with other modules. Therefore, the session authentication module 123 decrypts the client signature 429. As is evident in a variety of hash functions such as HMAC-SHA-1, RSA-SHA1 could be employed. The client signature is used as part of request to obtain an authenticated session, as explained later.

Figure 5A:
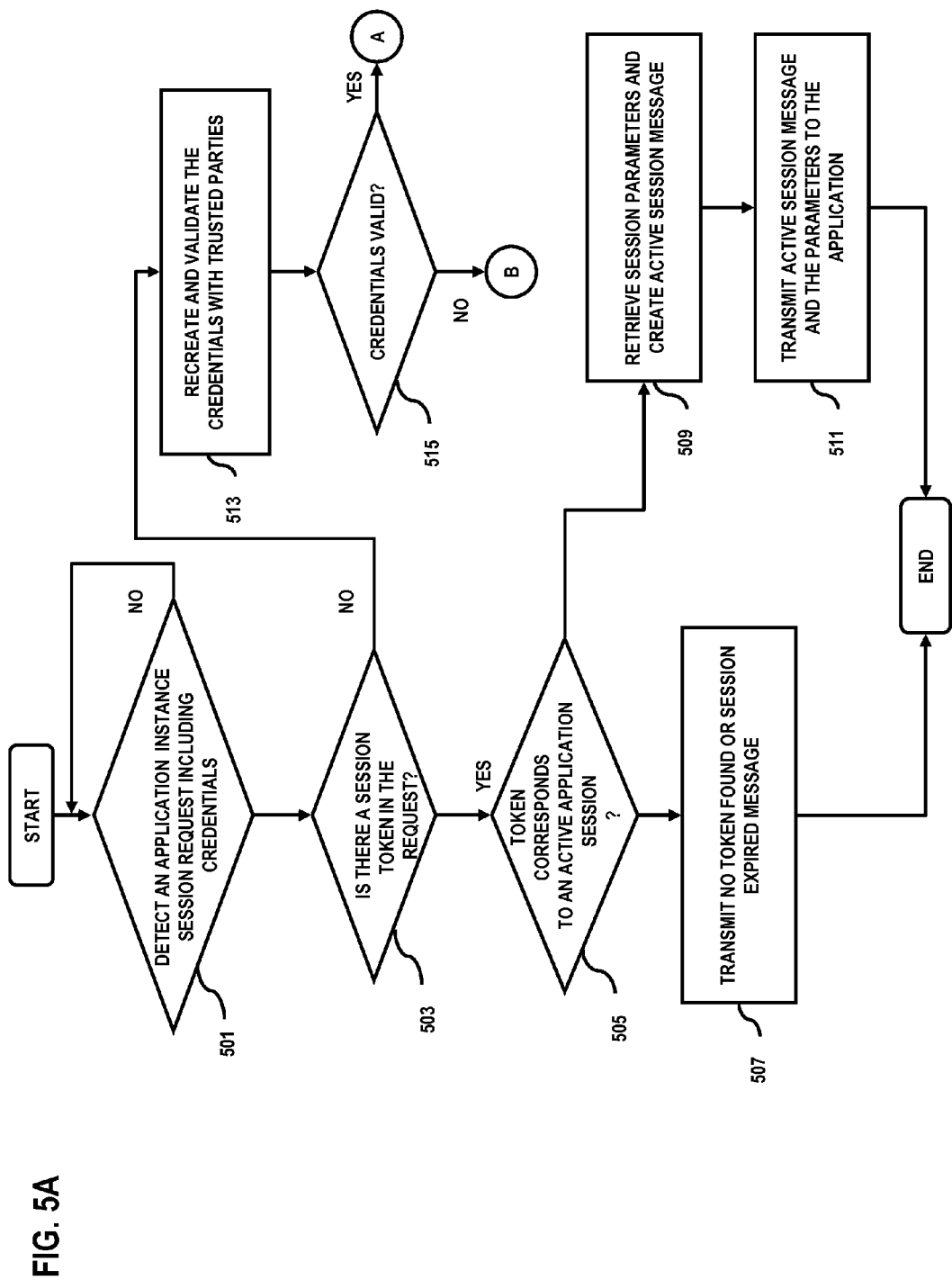
FIGS. 5A and 5B are flowcharts of a session authentication process, in accordance with one embodiment.
Figure 5B:
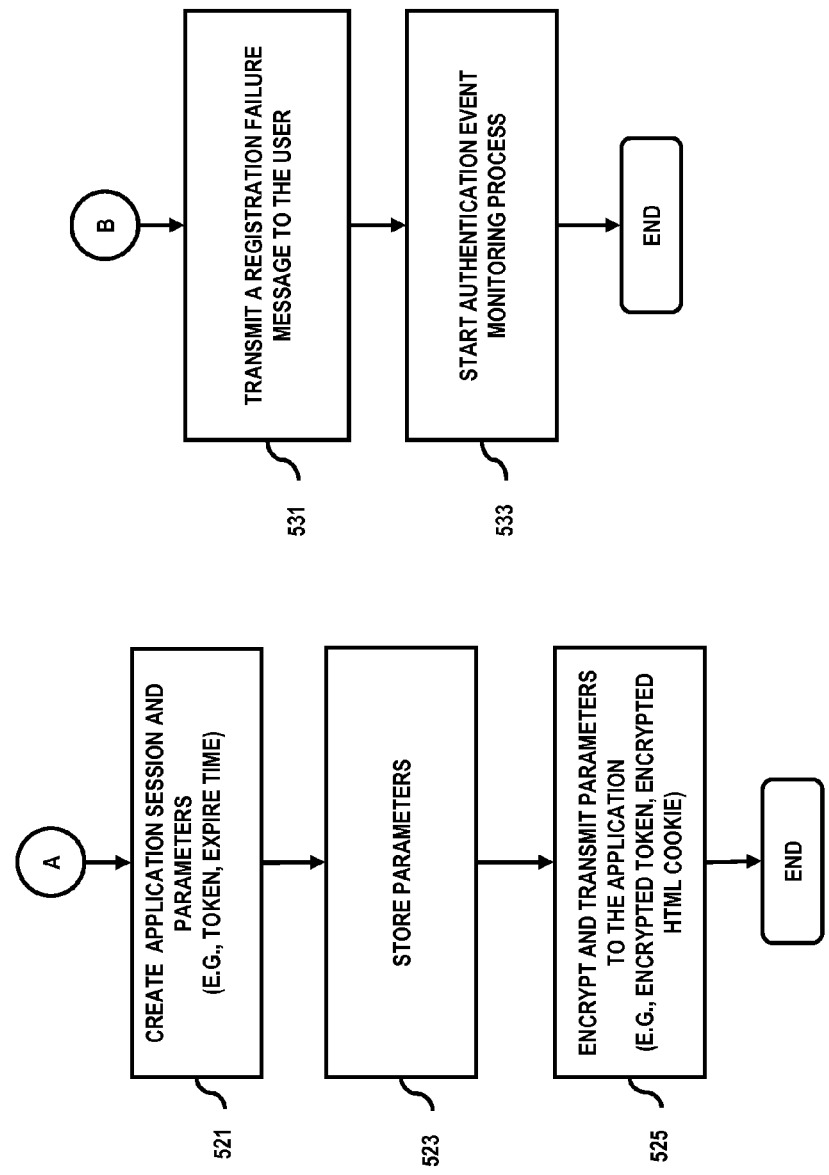

FIGS. 5A and 5B are flowcharts of a session authentication process, in accordance with one embodiment. With respect to FIG. 5A, in step 501, application session authentication module 123 detects an application session authentication request obtained from an application instance run on user equipment. The application 103 transmits its registration credential information. As previously noted, the credential information might include encrypted client identifier and client signature. It is further contemplated that the application 103 already had been granted an authenticated session, in which case the credentials might include an encrypted session token obtained previously.

Upon receiving the credentials, in step 503, the application session authentication module 123 checks if there is any session token in the credentials received. If there is such a token, then in step 505 it is checked whether the token corresponds to an active application session (i.e., a session not expired). If the token corresponds to no active session exists, then in step 507 a "NOT VALID TOKEN" or "SESSION EXPIRED" will be transmitted to the application. If in step 505, the token corresponds to an active session, then the session parameters are retrieved in step 509, and in step 511 a message indicating active session together with session parameters are transmitted to the user. One such parameter could be the expiration time for the current active session. This message may contain the result of a request for a resource or relevant response.

If in step 503 there were no token in the request, then the actual authentication step proceeds in step 513. In step 513, the application session authentication module 123 validates the encrypted credentials included in the authentication request. For example, the authentication request can contain an encrypted client identifier and a client signature. According to some embodiments, the application session authentication module 123 performs a hashing function similar to the one performed by the application 103 (as shown, e.g., in FIG. 4B) to recreate a local copy of the client signature. In doing so, the application session authentication module 123 uses, in one embodiment, the secret shared with the application 103 as the key. By way of example, the shared secret could be an application password. Upon performing the hashing function, the application session authentication module 123 compares the client signature received from the application with the local copy. If the two client signatures match, then the application client could be authenticated.

To provide higher levels of security, further validation measures can be taken. For example, the application session authentication module 123 may decrypt the encrypted client identifier using the secret key shared with the registration platform 104. Therefore, the application session authentication module 123 can obtain several other credentials about the application 103, the user, or the device 101; and module 123 can further check those credentials against trusted ones, which may be stored on database 129.

If the application credentials are valid, then the process continues as shown in FIG. 5B. In step 521, application session module 113 creates an authenticated application session and a token that contains information proving the authentication. The module 123 can create more session parameters, such as expiration time. In step 523, such parameters and the token are saved for future validation processes. In step 525, the module 123 encrypts the token and transmits the authenticated session message along with the token and other parameters to the application 103. The application session authentication module 123 can decrypt the token. In some embodiments, the token could be transmitted to the application 103, as an encrypted HTML cookie.

If the validation check, per step 515, is not successful, the process generates a session failure message for transmission to the application and possibly to the user (step 531). Failure of the session authentication can signal the presence of a rogue application. Therefore, in step 533, the application session authentication module 123 starts an authentication event monitoring process, which is more fully detained with respect to FIG. 6. This process monitors session or registration authentication attempts by an application in order to detect suspicious or malignant applications.

Figure 6:
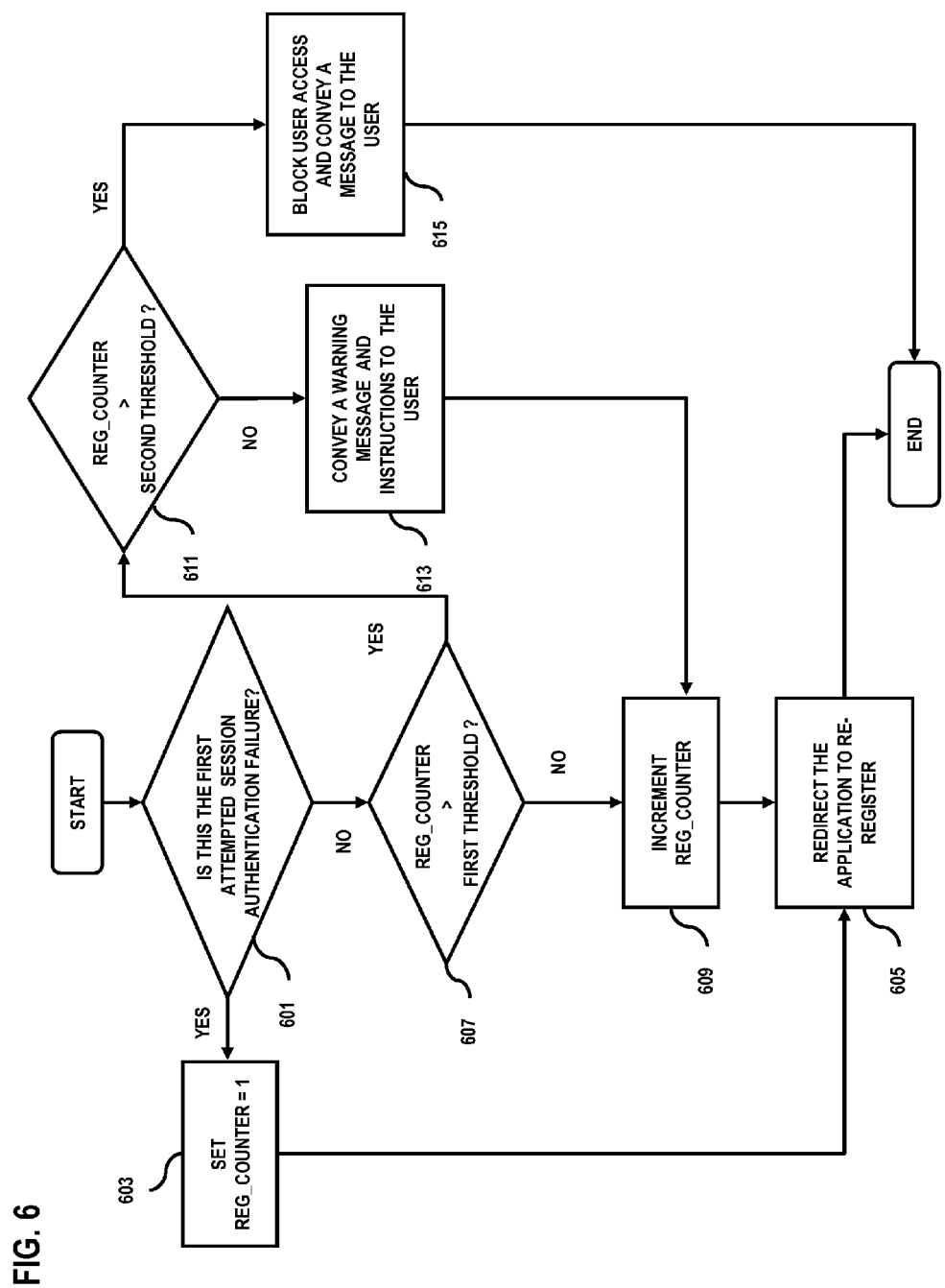
FIG. 6 is a flowchart of a process for monitoring failed session authentication, according to one embodiment.

FIG. 6 is a flowchart of a process for monitoring failed session authentication, according to one embodiment. This process, by way of example, can be performed by the authentication event monitoring module 125. The role of authentication event monitoring module 125 is to limit the number of possible registrations of an instance of an application and to take action based on a defined policy. According to certain embodiments the authentication event monitoring module 125 monitors authentication events as follows.

In step 601, authentication event monitoring module 125 checks whether this is the first attempted session authentication failure for the application. If it is the first failure, then in step 603 a counter named REG_COUNTER is set to 1, and in step 605 the application 103 is instructed or redirected to re-register with the registration platform 104. If this attempt was not the first attempt by the application instant, then in step 607 the value of REG_COUNTER is compared with a predetermined first threshold. If REG_COUNTER is not larger than the first threshold, then in step 609 is REG_COUNTER incremented and the application is instructed to register with the registration server again. If REG_COUNTER is equal or large than the first threshold, then in step 611, REG_COUNTER is compared with a second pre-defined threshold. If REG_COUNTER is not larger than the second threshold, then in step 613, a warning message together with some instructions are conveyed to the user and step 609 will be performed next. If REG_COUNTER is greater than or equal to the second threshold, then in step 615 the user account or access is blocked and the blockage message with further instructions are conveyed to the user.

It is contemplated the functionality of the authentication event monitoring module 125 could be realized in an entity separate from gatekeeper platform 121 or as a part of other authorization entities. In particular, in some embodiments the registration platform 104 might encompass this functionality. Moreover, in some embodiments the authentication event monitoring module 125 might be called, upon any registration or session authentication activity, to increase security level and attain an increased monitoring of resources.

According to an exemplary embodiment if the application 103 is attempted to be or is registered more than a predetermined threshold (e.g., three times) in a defined interval, a message is sent to the user(s) stating there is a registration problem and to contact the application developer (or some administrator). If an application is attempted to be or is registered more than a second threshold level, e.g., ten times in a defined interval, a message (SMS, email, phone call) is sent to the user(s) stating there is a registration problem and to contact the application developer (or some administrator) and application is blocked from additional registrations.

According to some embodiments, the gatekeeper platform 121 can encompass the registration module 127, which can replace a stand alone or spate registration platform 104. The application registration module 127, as a part of the gatekeeper platform 121, provides application registration facilities as described herein.

Figure 7A:
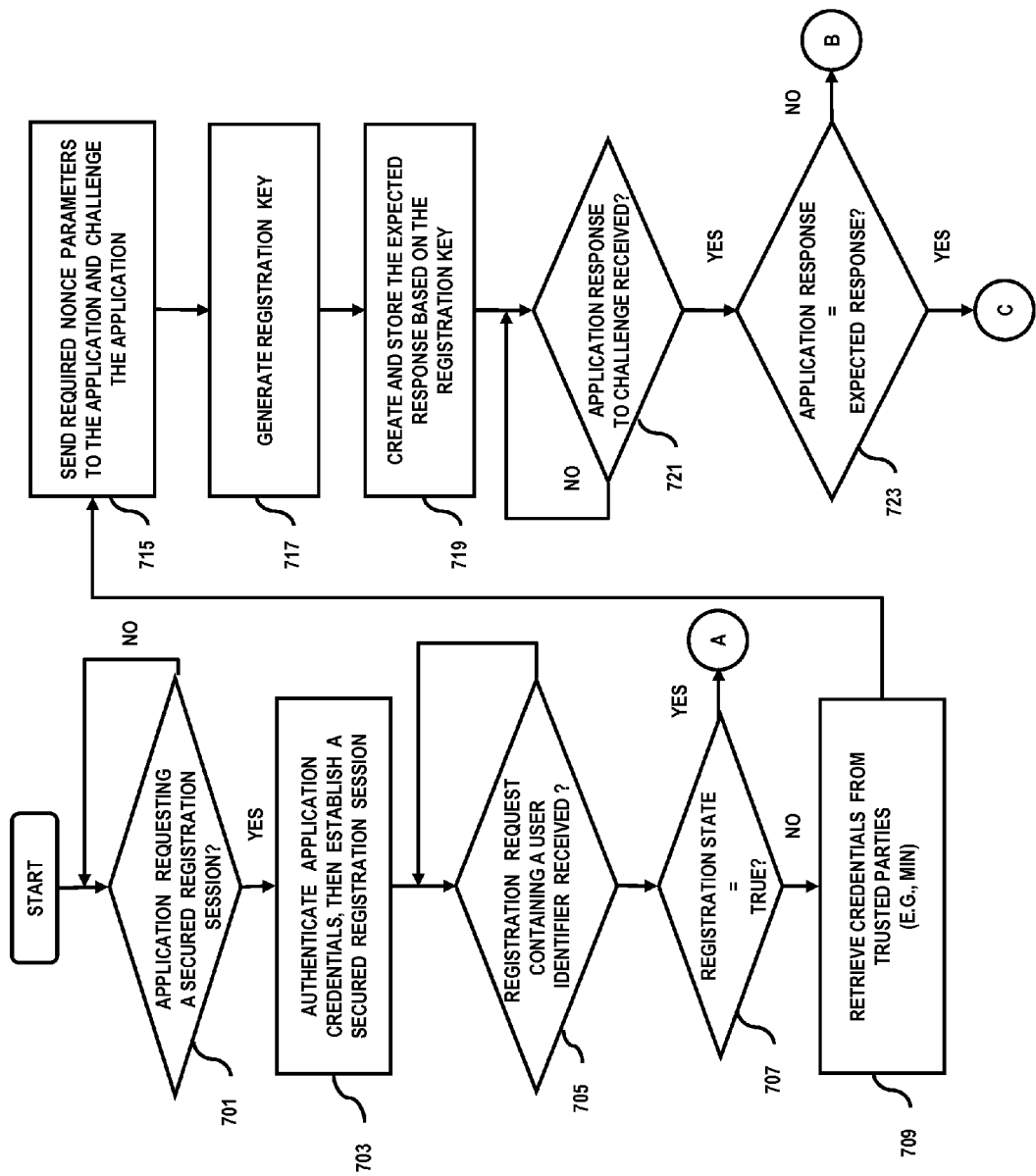
FIGS. 7A and 7B are flowcharts an application registration process, performed by a gatekeeper platform, in accordance with one embodiment.
Figure 7B:
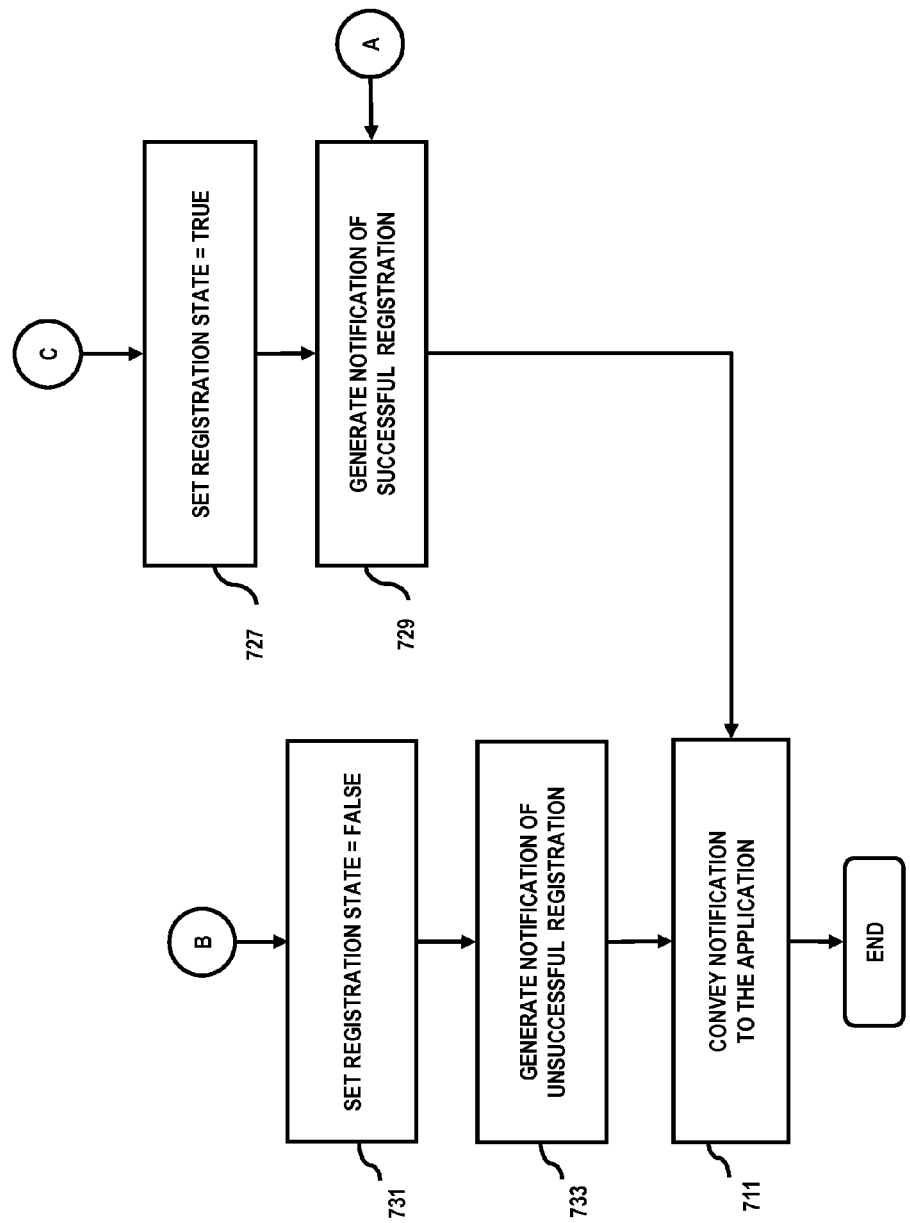

FIGS. 7A and 7B are flowcharts of an application registration process, performed by a gatekeeper platform, in accordance with one embodiment. In step 701 (shown in FIG. 7A), the application registration module 127 waits for an application to detect an application requesting a secured registrations session. Typically, such a request includes credential information from the application side, thereby permitting authentication of the credentials. In step 703, the registration module 127 authenticates the applications credentials and establishes a secured registration session. In step 705, the process checks whether the request includes a user identifier. For example, a user might enter the user MDN identifier for this purpose. Next, in step 707, the application registration process determines whether the application instance has already been registered by checking the registration state. In step 727 (see FIG. 7B), if the registration state is set to TRUE, credentials are retrieved from a trusted party. A notification of successful registration is generated, as in step 729, and can include the time of earlier registration. Next, in step 711, the notification is transmitted to the application 103.

If the application 103 was not previously registered (as determined in step 707), then the application registration module 127 retrieves, as in step 709, from one or more trusted parties some relevant credentials related to the application 103. For example, according to certain embodiments, the application registration module 127 can retrieve from the databases 129 a device identifier such as MIN associated with the received MDN. It should be noted that the MIN is typically associated with the MDN in the equipment registration process; therefore it can be considered as a trusted credential.

In step 715, the application registration module 127 transmits the retrieved credentials or other parameters as nonce to the application and challenges to application to create a registration key. In some HTTP-based embodiments, the application registration module 127 or the gatekeeper platform 121 can include the MDN or other parameters in the HTTP digest response nonce parameter. Details of the HTTP digest is more fully described with respect to Internet Engineering Task Force (IETF) Request for Comment (RFC) 2617, which is incorporated herein in its entirety.

In step 717, the application registration module 127 creates a registration key using a hash algorithm. This registration key generation is also performed at the application side (or device) as well. In step 719, the application registration module 127 stores an expected response based on the registration (e.g., it could simply store the created registration key). In step 721, the registration module 127 waits for a response from the application 103. Such a response, in some embodiments, is in the form of a pair (MDN, RegistrationKey'), wherein as RegistrationKey' is the registration key generated at the application side, according to the corresponding same process in the registration module 127. If the application response is received, then in step 723 the received response is compared with the expected response which was stored earlier. If the two expected and received responses match, then the Registration State flag is set to true, as in step 727. The process then generates a notification message indicating a successful registration of the application instance, as in step 729.

If the expected and received responses do not match (as determined in step 723), then in step 731, the Registration State flag is set to false. Thereafter, in step a 733 a notification of failed registration is generated. The notification is then conveyed to the application 103, as in step 711.

Figure 7C:
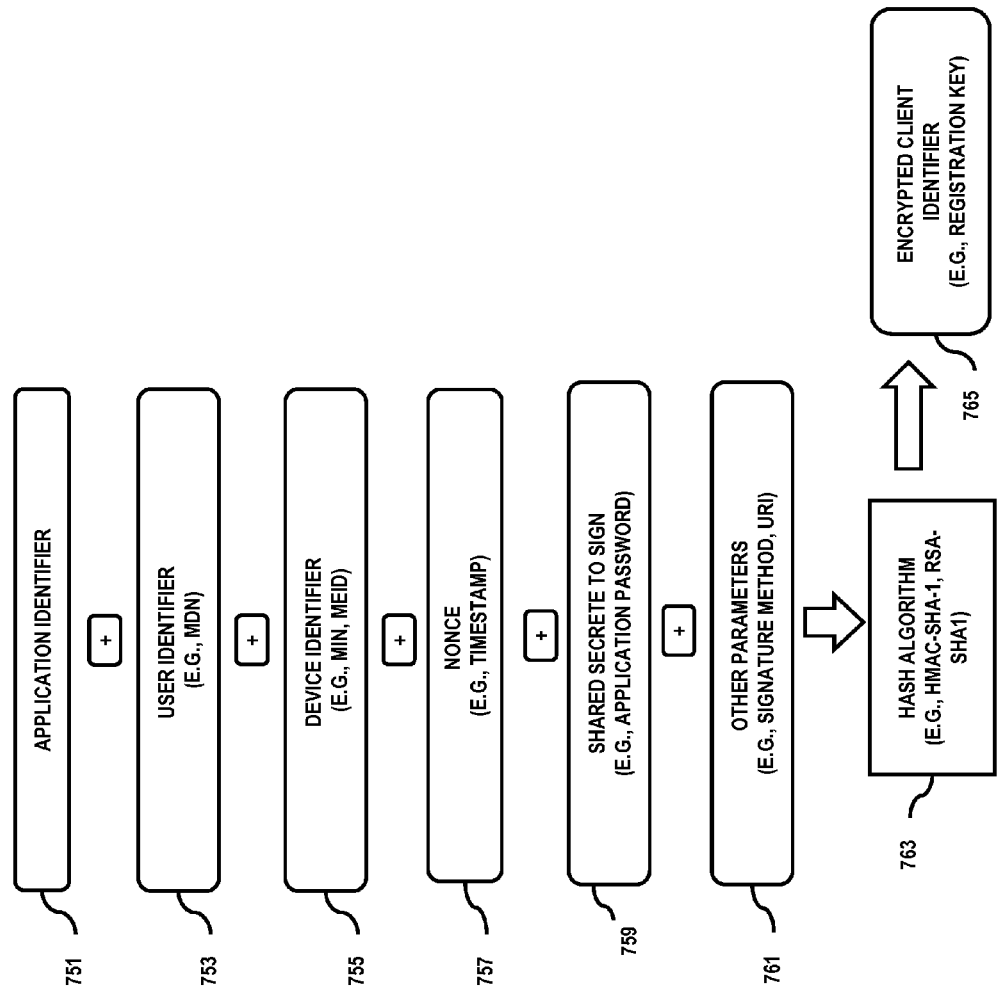
FIG. 7C is a diagram of a registration key generation process used in the process of FIGS. 7A and 7B, according to one embodiment.

FIG. 7C illustrates the process of the registration key generation (in step 717 of FIG. 7A), according to some embodiments. The registration module 127 and the application instance feed the same parameters to a hash wherein a secret shared with the application 103 (e.g., application password) also could be used. In some embodiments, the parameters input to the hash algorithm might include the application identifier 351, which is a name or string unique for the application as a computer program. The parameters further could include a user or subscriber identifier 753 (e.g., MDN), which binds subscription to the application 103. The parameters utilized in the encryption algorithm further can include a device identifier 755 (e.g., MIN, MEID) that binds the user device 101 to the application 103. In some embodiments, both MIN and MEID are used, particularly if MIN is retrieved from a trusted party, as described in step 713. In various embodiments, only the MIN parameter retrieved from the databases 129 could be used.

Further, a nonce parameter 757 might include a time stamp (e.g., date and time of the encryption process). Another parameter specifies a shared secret 759 between the application and the gatekeeper platform 121. Yet other parameters 761 include signature method used, or any relevant URI's. The hash algorithm 763 can be implemented using any standard algorithms, such as HMAC-SHA-1 (according to RFC 2104) or RSA-SHAT. Such hashing can be pre-determined by both sides (i.e., application 103 and the gatekeeper platform 121). The result of the algorithm is a registration key 765 that can in fact be an encrypted application identifier.

Upon completing the registration process, an application instance can request to establish an authenticated Application Programming Interface (API) session, as explained below with respect to FIGS. 8A and 8B. The gatekeeper platform 121, per the application session authentication module 125, can provide the facilities.

Figure 8A:
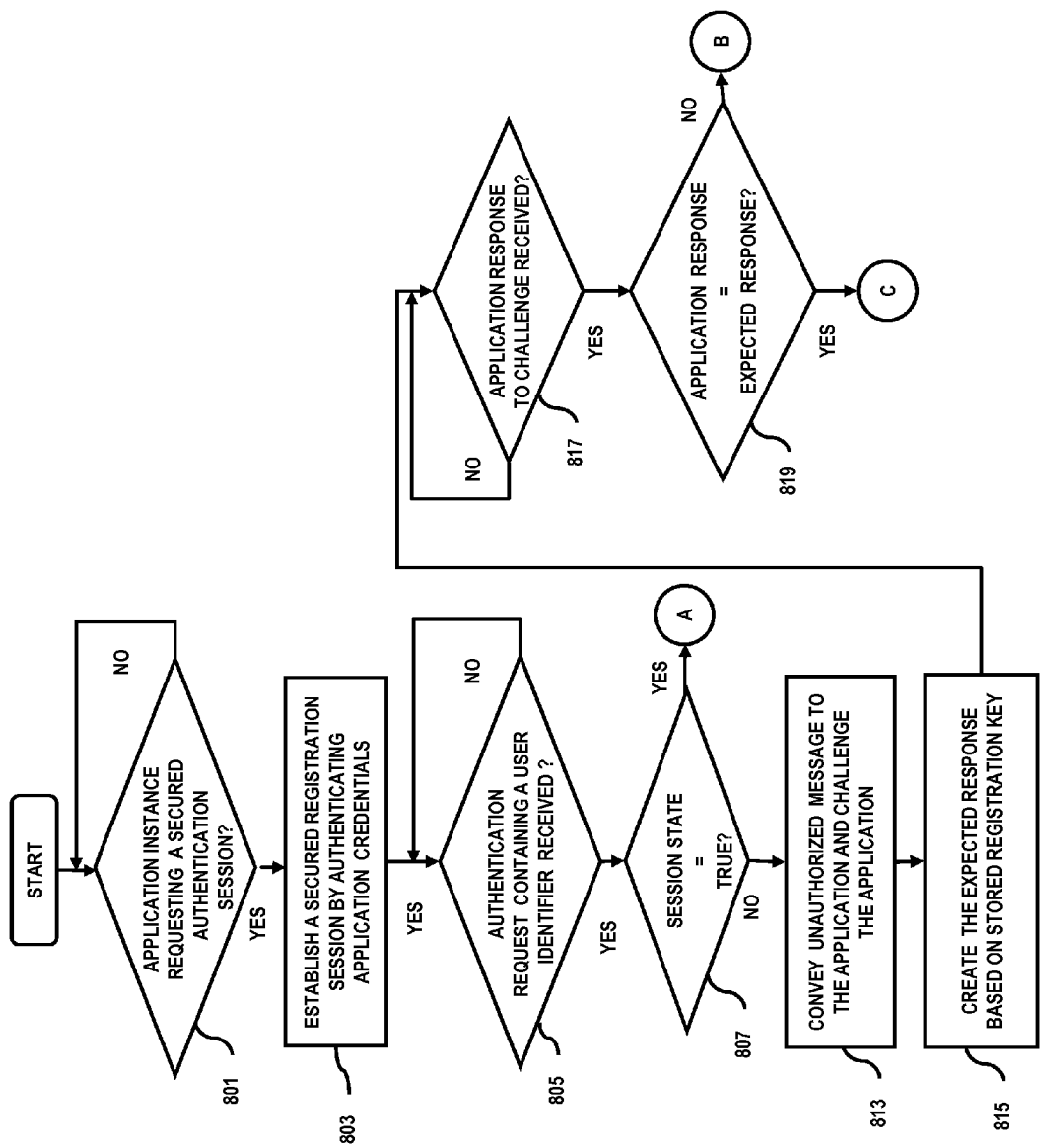
FIGS. 8A and 8B are flowcharts of an exemplary session authentication process, according to one embodiment.
Figure 8B:
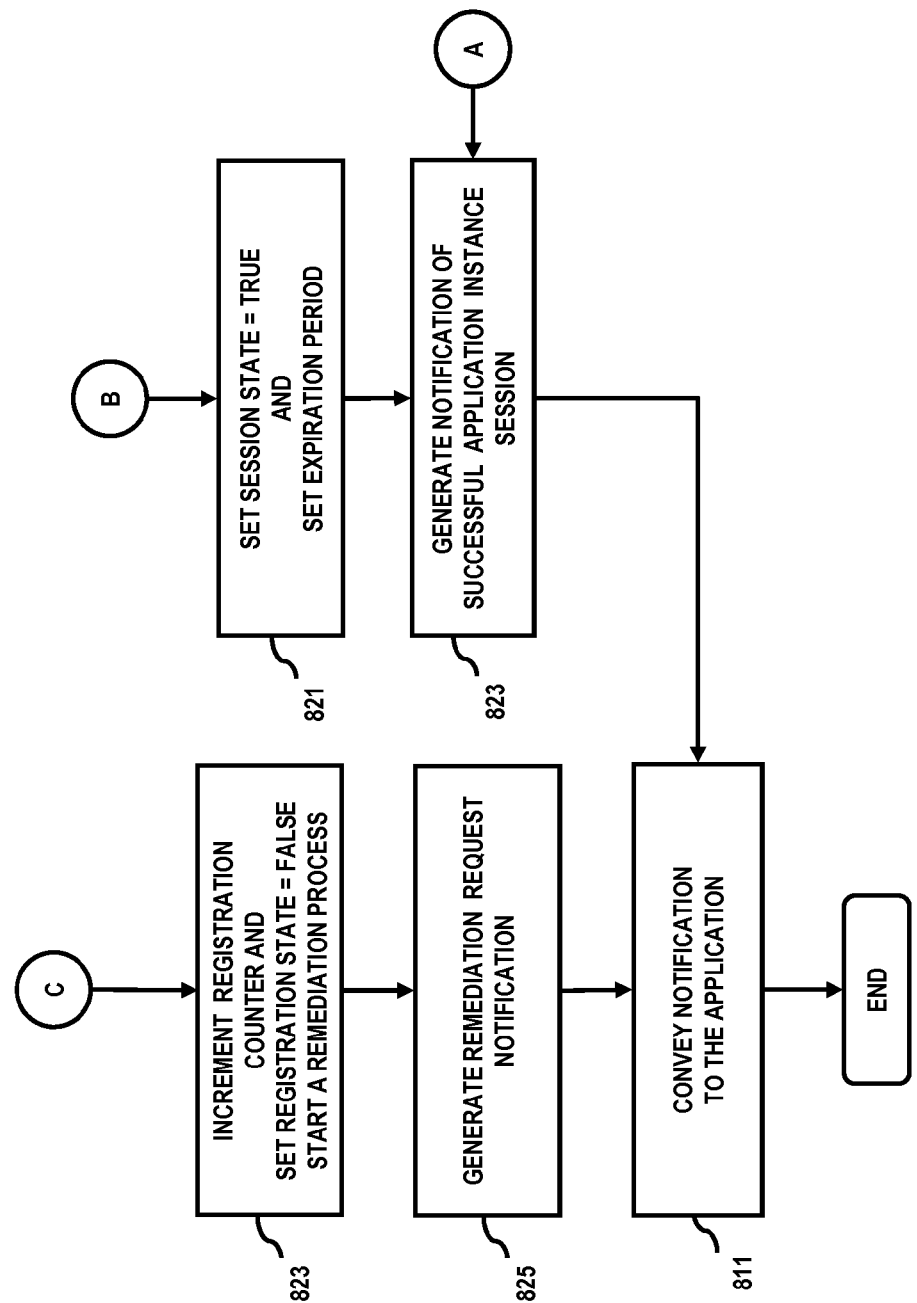

FIGS. 8A and 8B are flowcharts of an exemplary session authentication process, according to one embodiment. As seen in FIG. 8A, in step 801, the process determines whether an application instance requesting an authentication session is detected. Such a request can provide credential information, such as application password or application identifier, which could be verified by the gatekeeper platform 121 (or the session authentication module 123). After this verification, a secured session authentication session is established, per step 803. According to various embodiments, such a session might be an Secure Sockets Layer (SSL) session or similar. In step 805, the session authentication module 123 waits to receive an API request containing a user identifier (e.g., MDN). If such a request is received, in step 807 a Session State flag is checked to determine whether an already established session exists or not. If the Session State flag is true, in step 821 (of FIG. 8B) a notification of successful application instance session containing possibly an expiration time is generated; and in step 823, the notification is transmitted to the application 103.

If in step 807, the Session State is determined to be set to false, then in step 813, an "unauthorized session" message is transmitted to the application 103. Further, the application 103 is challenged to provide credentials. Such a message might be an HTTP 401 unauthorized message. In step 815, the application session authentication module 123 creates an expected response based on the Registration Key stored by the application registration module 127. In step 817, the gatekeeper platform 121 (or equivalently application session authentication module 123) waits to receive a response to the challenge from application instance. The response can be, for example, in form of a pair (MDN, RESPONSE'), where RESPONSE' is the response generated by the application based on the copy of Registration Key on the application side. The response can be as simple as the Registration Key itself or more sophisticated, such as the combination of Registration Key and a password.

In step 819, the process compares the two responses—i.e., whether RESPONSE=RESPONSE'. If the received response matches the expected response in step 821 Session State flag is set to true and expiration time is set for the application session. In step 823, the process generates a notification of a successful registration of an application instance session.

Furthermore, if the two responses do not match in step 819, then in step 823 a registration counter variable REG_COUNT is incremented, and the Registration State and Session State flags are set to false and an authentication event monitoring also called remediation process is started. This could happen by calling the authentication event monitoring module 121. Such a process could be performed as explained by an example in FIG. 6. In step 825, a remediation request notification is also generated and transmitted to the application 103 (per step 811).

Figure 9:
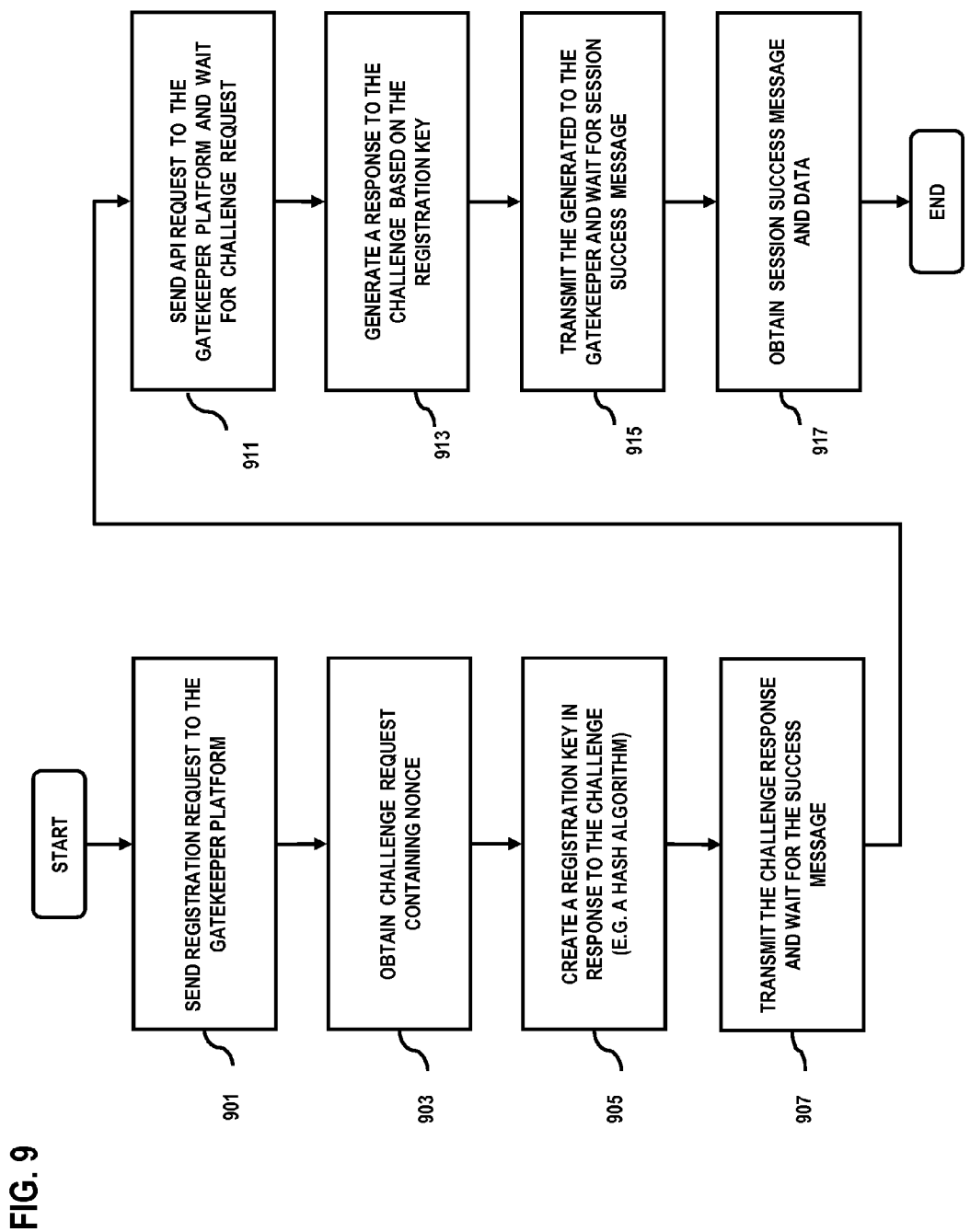
FIG. 9 is a flowchart of a registration process performed by an application, according to one embodiment.

FIG. 9 is a flowchart a registration process performed by an application, according to one embodiment. In step 901, a registration request is sent to the gatekeeper platform 121. This procedure can involve establishment of an SSL session based on certain credentials. Furthermore, the request might contain MDN of the device, an application password and an application identifier, as explained previously. In response to this request, in step 903, the application 103 receives a challenge from the gatekeeper platform 121. Such challenge might contain a nonce, for example, the MIN retrieved by the gatekeeper 121 from a trusted party, as explained before. The application 103 then, in step 905, uses the MIN and other parameters in a hashing step, as described in FIG. 7C, to create a registration key. This step is the same as the one performed by the gatekeeper platform 121 or the application registration module 127 therein. The result of this step is a copy of the Registration Key on the application side.

Next, in step 907, a response is transmitted to gatekeeper platform 121, and the application 103 waits for the response from gatekeeper. In some embodiments, the response transmitted to the gatekeeper platform 121 can be of the form: (MDN, Registration Key). Upon receiving the registration success message, the user could launch an instant of the application and the application 103 could be granted a session to access protected resources. For example, in step 911, an API request could be sent to the gatekeeper platform 121 (or the session authentication module 123); and the application 103 waits for a challenge from the gatekeeper platform 121. Upon receiving the challenge the application 103 creates a response, in step 913. In some embodiments, the response might be of the form (MDN, RegistrationKey) or (MDN, RESPONSE'), where RESPONSE' is a response created based on the RegistrationKey created and stored in application or user device 101. In step 915, the response is transmitted to the gatekeeper platform 121 and the application 101 waits for the success response. Upon comparing the transmitted response with the expected response, the gatekeeper platform 121 validates the request and application session will be granted. Therefore, in step 917 the session success message and other session data (e.g., expiration time) are obtained from the gatekeeper platform 121. This message may contain the response data to the API request.

The above processes and systems, in certain embodiments, advantageously prevent rogue applications, thereby reducing waste of network resources as well as device resources.

The processes described herein for providing registration of an application instance may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
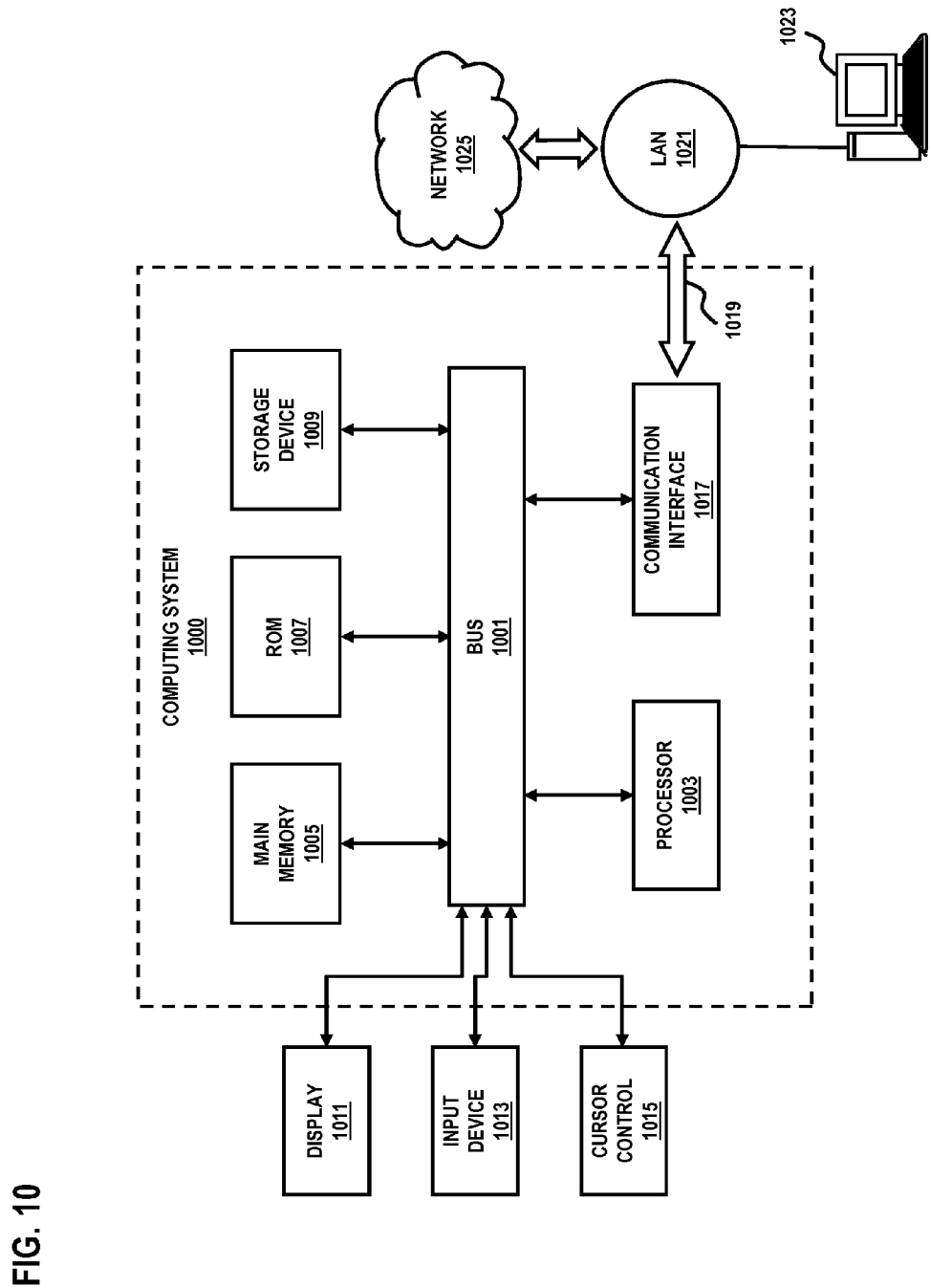
FIG. 10 is a diagram of a computer system that can be used to implement various exemplary embodiments.

FIG. 10 illustrates computing hardware (e.g., computer system) 1000 upon which exemplary embodiments can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003.

Another type of user input device is a cursor control 1015, such as a mouse, a trackball, or cursor direction keys, for communicating direction information and command selections to the processor 1003 and for controlling cursor movement on the display 1011.

According to an exemplary embodiment, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement exemplary embodiments. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
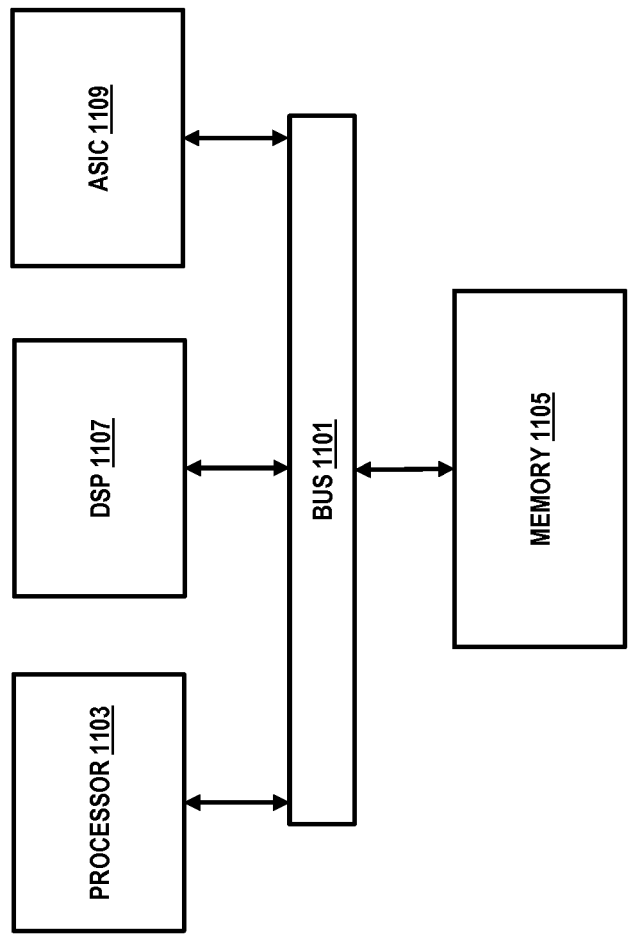
FIG. 11 is a diagram of a chip set that can be used to implement various exemplary embodiments.

FIG. 11 illustrates a chip set 1100 upon which an embodiment of the invention may be implemented. Chip set 1100 is programmed to present views and manage cutover events as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 2-9.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1105 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   generating a registration request including credential information related to a device and an instance of an application resident on the device;
   transmitting the registration request over a network to a registration platform;
   receiving, from the registration platform, a unique identifier that is encrypted, in response to registration of the application instance; and
   generating an application instance session request including the encrypted unique identifier for authenticating each session of the instance of the application in accessing resources related to the application,
   wherein the registration platform is configured to obtain second credential information from a trusted entity different from the registration platform,
   wherein the second credential information includes an authenticated identification of the application, an authenticated identification of the user, and an authenticated identification of the device,
   wherein the registration platform is further configured to store the second credential information, and
   wherein the registration platform is further configured to use the stored second credential information to determine whether or not to provide the unique identifier that is encrypted.

2. A method according to claim 1, further comprising:
   establishing a secure communication with the registration platform to transport the registration request, wherein the credential information includes an application identifier that uniquely identifies the application, a user identifier, and a device identifier.

3. A method according to claim 2, further comprising:
   receiving uniform resource identifier (URI) associated with the unique identifier.

4. A method according to claim 2, wherein the registration platform is configured to compare the user identifier and the device identifier with the stored authenticated second credential information, the encrypted unique identifier being generated based on the comparison.

5. A method according to claim 1, wherein the registration request further includes a license file, and the registration platform is configured to perform an authentication and integrity check of the license file, and the application instance session request further includes an application signature determined based on a nonce and a shared secret.

6. An apparatus comprising:
   at least one processor; and
   at least one memory including computer program code for one or more programs,
   the at least one memory and the computer program code configured to, with the at least one processor, cause the apparatus to perform at least the following,
   generate a registration request including credential information related to a device and an instance of an application resident on the device,
   transmit the registration request over a network to a registration platform,
   receive, from the registration platform, a unique identifier that is encrypted, in response to registration of the application instance, and
   generate an application instance session request including the encrypted unique identifier for authenticating each session of the instance of the application in accessing resources related to the application,
   wherein the registration platform is configured to obtain second credential information from a trusted entity different from the registration platform,
   wherein the second credential information includes an authenticated identification of the application, an authenticated identification of the user, and an authenticated identification of the device,
   wherein the registration platform is further configured to store the second credential information, and
   wherein the registration platform is further configured to use the stored second credential information to determine whether or not to provide the unique identifier that is encrypted.

7. An apparatus according to claim 6, wherein the apparatus is further caused to:
   establish a secure communication with the registration platform to transport the registration request, wherein the credential information includes an application identifier that uniquely identifies the application, a user identifier, and a device identifier.

8. An apparatus according to claim 7, wherein the apparatus is further caused to:
   receive uniform resource identifier (URI) associated with the unique identifier.

9. An apparatus according to claim 7, wherein the registration platform is configured to compare the user identifier and the device identifier with the stored authenticated second credential information, the encrypted unique identifier being generated based on the comparison.

10. An apparatus according to claim 6, wherein the registration request further includes a license file, and the registration platform is configured to perform an authentication and integrity check of the license file, and the application instance session request further includes an application signature determined based on a nonce and a shared secret.

* * * * *